WHELPLEY & STORER.
Improvement in the Process of Roasting, Burning, and Smelting Ores.
No. 4,897. Reissued May 7, 1872.
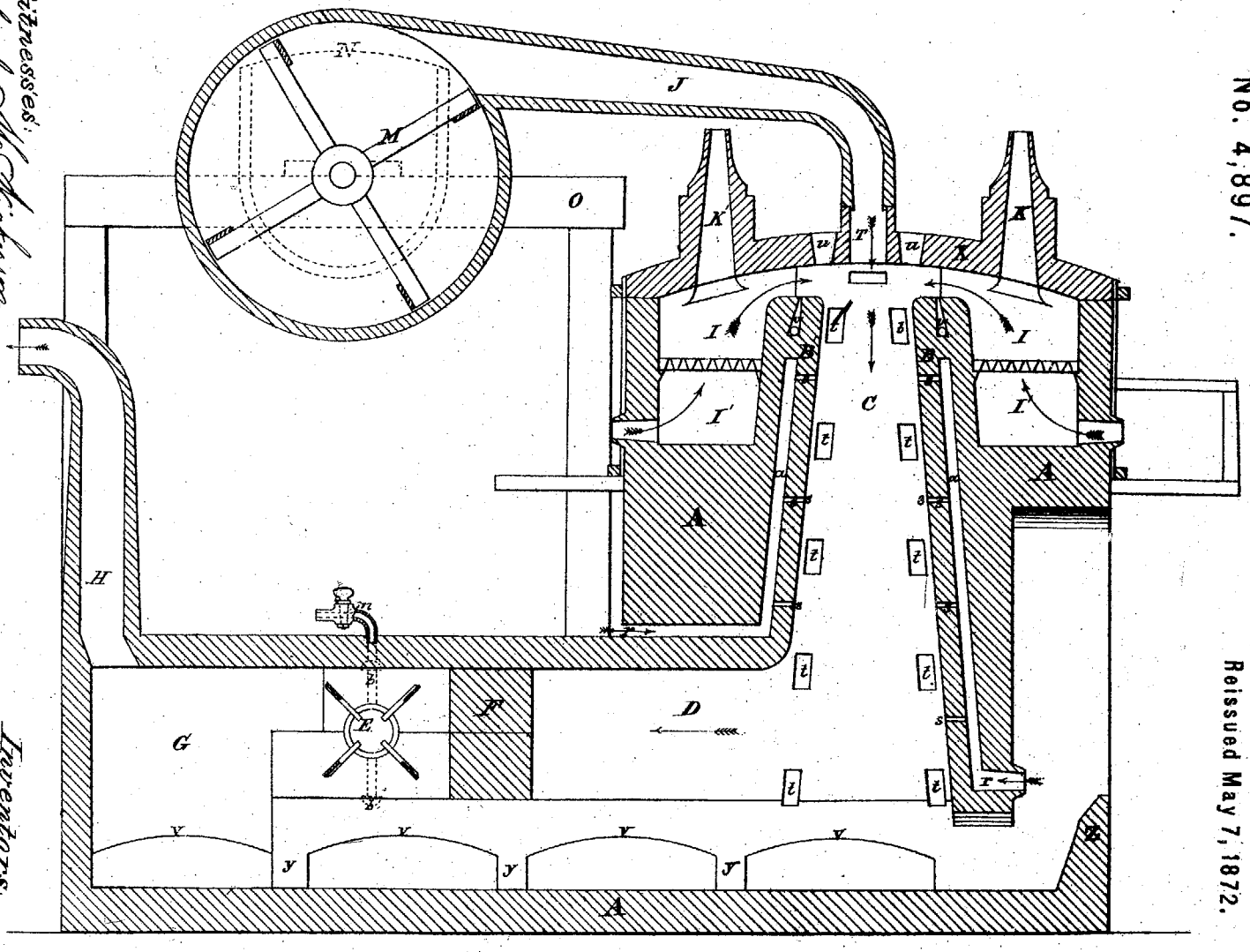
Witnesses:
Charles M. Nickerson
Fred W. Longley
Inventors:
James D. Whelpley
Jacob L. Storer.

UNITED STATES PATENT OFFICE.

JAMES D. WHELPLEY AND JACOB J. STORER, OF BOSTON, MASS.

IMPROVEMENT IN FURNACES FOR ROASTING, BURNING, SMELTING, AND TREATING ORES.

Specification forming part of Letters Patent No. 41,250, dated January 12, 1864; reissue No. 4,897, dated May 7, 1872.

DIVISION A.

SPECIFICATION OF DIVISION B.

*To all whom it may concern:*

Be it known that we, JAMES D. WHELPLEY and JACOB J. STORER, of Boston, in the county of Suffolk and State of Massachusetts, have made a new and useful Improvement in Furnaces for Roasting, Burning, Smelting, and Treating Ores; and we hereby declare the following to be a full and exact description of the same, reference being had to the annexed sheet of drawing which forms a part of this specification, and which shows a longitudinal vertical section of a furnace constructed according to our invention.

The essential features of our invention, and which singly and collectively constitute the same, are, first, a flue, shaft, or furnace, through which the ore to be treated either falls or is blown, and through which the flame, hot air, or gases to roast or burn the ore are passed. Second, in combination with such flue, shaft, or furnace, a gas-generator or fire-box in which fuel may be burned, to produce hot gases to roast or burn the ore as it passes through the shaft, flue, or furnace. Third, in combination with the shaft, flue, or furnace, apparatus for feeding finely-pulverized ore, either alone or mixed with suitable chemicals for treating the ores, so as to bring together in the shaft, flue, or furnace the pulverized ore and chemicals, when used, and the gases or products of combustion from the gas-generator or fire-box. This apparatus may be either a fan furnishing a blast of air on which the finely-pulverized ore is floated into the shaft or furnace, or a sifting apparatus by which the ore in fine powder is fed into and evenly distributed over the mouth of the shaft or furnace. Fourth, a settling-chamber, arranged, in combination with the roasting-shaft or furnace, so that after the pulverized ore has passed through the shaft, flue, or furnace it may be collected either on a dry hearth or on a hearth covered with water. Fifth, a spray-chamber in combination with the settling-chamber, or directly in combination with the roasting-shaft, so that the fine particles of ore, and the gases or fumes which do not deposit either in the shaft or in the settling-chamber may be washed down, condensed, or precipitated by water showered or dashed in spray through the spray-chamber. Auxiliary to these five main parts of our invention are flues or pipes in the body of the furnace, so arranged that steam, when required, may be injected with the products of combustion, to aid in effecting the treatment of the ore, and also flues or pipes by which heated air may be introduced to the ore at different points as it passes through the roasting shaft or furnace.

We do not limit ourselves to the exact arrangement of parts, as these may be greatly varied without departing from the principles of our invention.

The following description will enable persons skilled in the art to which it relates to make and use our invention.

A is the shell of the furnace, of brick or other suitable material. C is the drop-flue or flame-chimney, from twelve to twenty feet deep, formed by the four partitions B B′. A cross-section of this chimney is a parallelogram, measuring at the top six feet by one and one-half and at the bottom six feet by three. D is a horizontal continuation of the flame-chimney C, supported by the piers Y and arches V, the latter being below the level of the top of the trough or tank Z, so that when said tank is full of water the surface of the water shall form, in effect, a bottom to the flue D, which arrangement allows the deposit on the bottom to be raked out under the arches V, without disturbing the draught or opening the furnace. F is a partition or three-sided box extending down from the top of the flue D a little more than half-way toward the bottom of the same, leaving a space between the sides of the flue for the draught to pass through the holes *g* in the sides of said box. E is a fan-wheel, placed as shown in the drawing, the axle passing through the holes *g* in the sides of the box F, the design of the wheel being to increase the draught and draw into the flame-chimney C, through the ports *t* and *u* and passages *r a s*, an additional supply of air. Attached to the shaft of the fan-wheel E, outside of the spray-chamber or air-box of the wheel, are arms or dashers *b*, in the passage-way leading from the chamber to the blower, which arms, when revolving, strike the water, whereby the passages are kept cool with spray and the flame of the furnace prevented from extending into the wheel. The ends of the arms of the fan-wheel also strike the surface of the water and fill the chamber G with spray, by which all the floating dust and particles of metal are wet down, condensed, and deposited on the bottom of the chamber G, and saved, instead of being carried off through the chimney H and lost. To further increase the quantity of spray in the spray-chamber, water may be let in through pipes or openings at any convenient point, as through the stop-cock and pipe *m*. I I are the fire-boxes, provided with grates P P, on which the fuel is placed, the air being drawn or forced in through suitable openings in the ash-pit I′. K and K′ are chimneys, provided with dampers which are intended to be closed, except when the fire is being kindled on the grates P P and a direct upward draught is desirable. T is an induction-pipe or hopper on the top of the cover X and situated directly over the center of the flame-chimney C, as shown in the drawing. M is a fan-blower, mounted on a suitable frame, O, and connected with the hopper T by means of the pipe J. N (shown by the dotted lines) is a hopper opening into the center of the blower M, into which hopper is fed the finely-pulverized substance to be smelted, burned, or roasted, the same being driven by the current of air generated by the fan, through pipe J, into hopper T, and thence into the flame or drop chimney C, where it comes into immediate contact with the flame and heat from the burning fuel in the fire-boxes I I. The column of air from the blower M down through the chimney C increases, by lateral suction, the draught through the fuel in the fire-boxes; and this draught is still further increased by the combined action of the blower E and the auxiliary blower opening into the ash-pits (not represented, being in common use in other furnaces.) The blower E is intended to be from five to six times more powerful than the blower M—so powerful as to draw into the chimney C, to aid combustion, strong currents of air through all the ports and openings in the sides of the chimney, when required. Indeed, in some cases we dispense with the fan-wheel M and depend for the draught entirely on the fan-wheel E and the auxiliary blowers forcing air into the ash-pits, the material to be acted upon by the flame being sifted into the hopper T. When it is required to mingle steam with the flame and gases to produce certain results it may be admitted from pipes *w* into a chamber, *v*, at the top of the chimney and through an opening, 3. From the above description it is obvious that a large percentage of the material roasted, burned, or smelted will fall upon the hearth of the furnace or (when water is used) into the water-bath W. The remaining portion of the material will be drawn by the fan E into the spray-chamber G, where it will be wetted down and condensed and thereby prevented from being lost by passing out through the chimney H.

Having thus described our invention, what we claim, and desire to secure by Letters Patent of the United States, is—

1. A furnace for roasting ores, composed of a shaft or chamber through which the ore in fine powder may be blown or fall, a combustion-chamber for producing hot gases or heated products of combustion, and devices for feeding ore in fine powder into the shaft or flue, all substantially as specified.

2. A settling-chamber, D, in combination with a shaft or furnace, C, substantially as specified.

3. The combination of the spray-chamber with the roasting-shaft, as set forth.

4. The combination of two or more furnaces, I I, with a shaft, flue, or chamber, C, as described.

5. The side openings in the perpendicular flue at graduated distances, with brick or iron removable stoppers, substantially as set forth, for the purpose of inspection and the admission of atmospheric air.

6. The combination of two blowers, one at the head or above and the other below, in the horizontal flue, to produce a balanced blast, substantially as described.

7. The water-bath or a wet hearth, commencing at the bottom of the perpendicular flue and extending along the horizontal flue, substantially as and for the purpose described.

8. The spray-chamber G and an induction-pipe or sluice from the top or side, substantially as and for the purpose described.

9. The pool of water in the spray-chamber, connected by a circuit or canal with the water external to the furnace, for the purpose of making a continual circulation, substantially as described.

JAMES D. WHELPLEY.
JACOB J. STORER.

Witnesses:
CHARLES M. NICKERSON,
FRED. W. LONGLEY.